Figure 1:
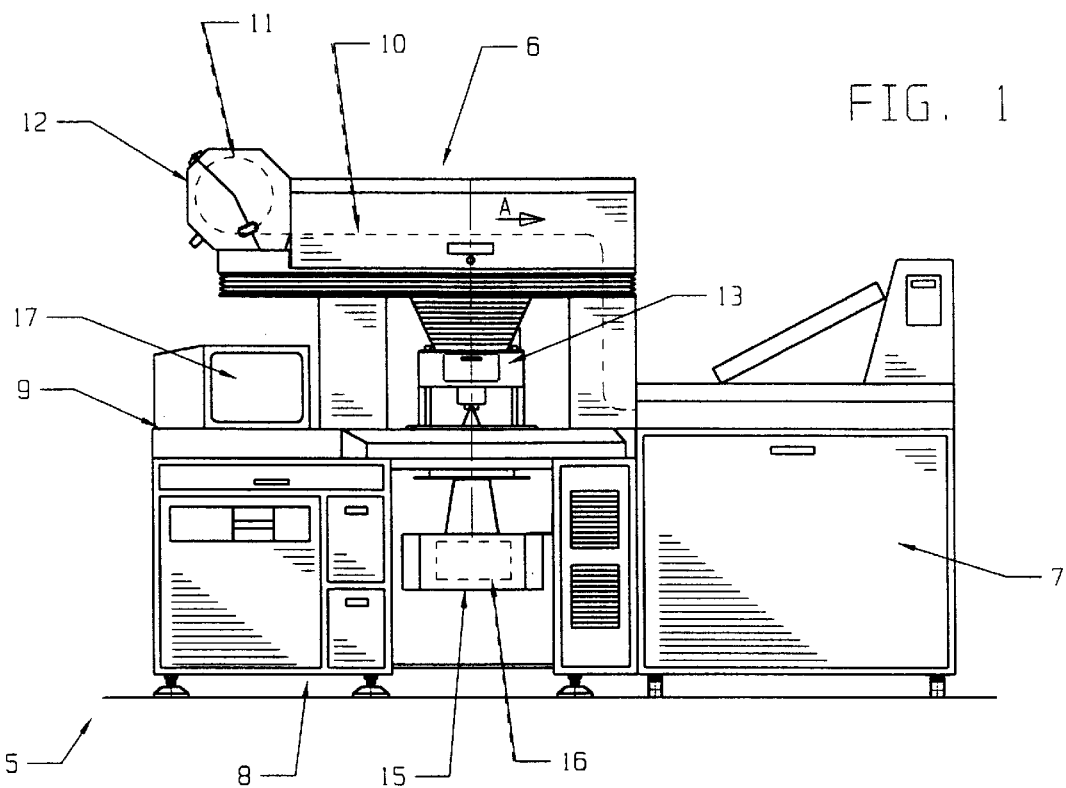

United States Patent [19]
Gregoris et al.

[11] Patent Number: 6,163,364
[45] Date of Patent: Dec. 19, 2000

[54] OPERATION CONTROL DEVICE FOR PHOTOGRAPHY PRINTING AND DEVELOPING MACHINE

[75] Inventors: Giuseppe Gregoris, Azzano Decimo; Ivo Del Ben, Tiezzo di Azzano Decimo, both of Italy

[73] Assignee: G.P.E. S.r.l., Azzano Decimo, Italy

[21] Appl. No.: 09/268,233

[22] Filed: Mar. 15, 1999

[30] Foreign Application Priority Data

Mar. 19, 1998 [IT] Italy .................................. PN98A0021

[51] Int. Cl.[7] .................................................. G03B 27/52
[52] U.S. Cl. ................................................. 355/40; 355/27
[58] Field of Search ................................ 355/27, 40, 41, 355/28, 29

[56] References Cited

U.S. PATENT DOCUMENTS

| | | | |
|---|---|---|---|
| 5,159,385 | 10/1992 | Imamura | 355/40 |
| 5,452,050 | 9/1995 | Ishikawa et al. | 355/27 |
| 5,886,774 | 3/1999 | Nishida et al. | 355/40 |
| 5,956,127 | 9/1999 | Masutani | 355/27 |
| 5,966,198 | 10/1999 | Yamamoto et al. | 355/27 |
| 6,008,878 | 12/1999 | Masutani | 355/40 |
| 6,031,596 | 2/2000 | Ishii et al. | 355/27 |

*Primary Examiner*—Alan A. Mathews
*Attorney, Agent, or Firm*—Bucknam and Archer

[57] ABSTRACT

Operation control device for photography printing and developing machines, wherein the images of negatives are projected on photographic paper, by exposing it, and wherein the exposed paper is then developed and printed. Device comprising central control means (23) communicating with the control unit (19) of each printing and developing machine (6, 7) and displaying means (monitor 17) for the negatives of each machine, contained into magazines (25), wherein such central control means (23) are adapted to set the data of the characteristics of the operative cycles to be carried out in the different machines and to control such cycles, independently from those of the other machines, and to activate at random every machine as soon as one operative cycle is ended, in order to permit a subsequent cycle to be carried out.

4 Claims, 2 Drawing Sheets

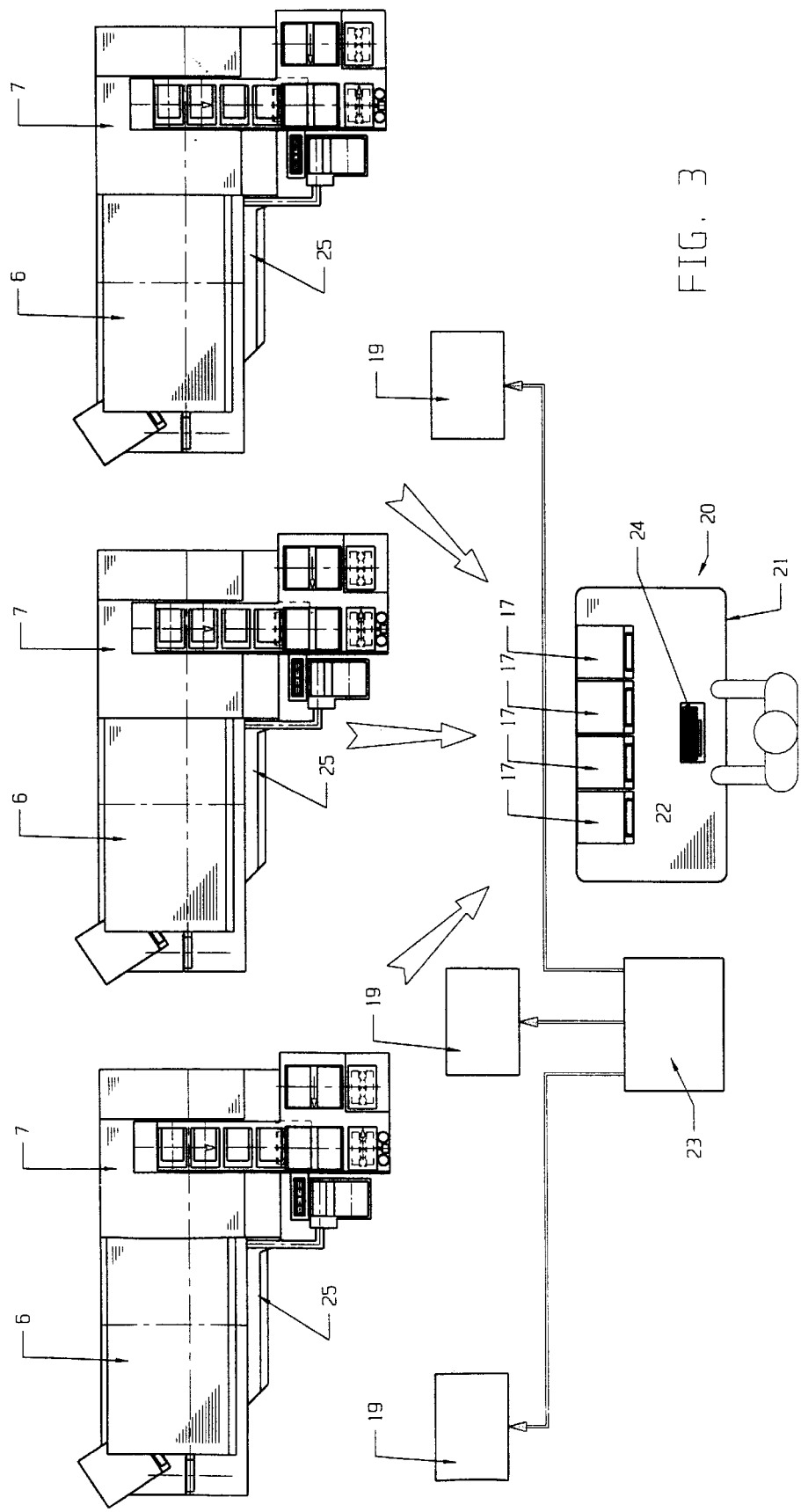

OPERATION CONTROL DEVICE FOR PHOTOGRAPHY PRINTING AND DEVELOPING MACHINE

The invention relates to an operation control device for a plurality of photography printing and developing machines, adapted to co-ordinate automatically the operation of such machines so as to provide for the continuous printing and developing of large numbers of photographs.

At the present time, professional types of laboratories for printing and developing of large numbers of photographs and in particular of colour photographs are known, each one of them comprising a pater provided with photographic paper in which a plurality of photographic printings starting from respective negatives is obtained, and a developing machine associated to such printing machine in which the photographic paper is developed in such a manner as to obtain the relative printed positive photographs.

In particular, the printing machine is substantially composed of a metallic structure in the upper part of which the photographic paper is housed, which is wound on a relative coil and associated to supply and cutting means of conventional type, providing for feeding it selectively in a single direction so as such paper is subsequently exposed and cut in parts of different length depending on the number of photographs to be obtained.

Moreover, such machine is composed of a set of lamps housed in the lower part thereof and formed by lamps of red, green and blue colors with manual and/or automatic lighting intensity adjustment, which are associated to an optic assembly with focal length adjustment situated over them, in which each negative of the photographs to be obtained is laid on the machine at the level of such set of lamps and optic assembly, so that the light beam generated by such lamps passes through such negative and projects the image thereof, adequately focused by the optic assembly, on the photographic paper disposed above them with consequent exposure of this latter and subsequent transport of the so exposed paper towards the developing machine, which therefore provides to supply the printed photographs with the desired characteristics.

Finally, the printing machine is composed of a color telecamera associated with the set of lamps and optic assembly and connected to a color monitor for displaying each negative, in order to inspect the negative enlarged image and regulate in advance, by acting on a keyboard connected operatively to the different component parts of the printing and developing machine, the characteristics of sharpness, brightness, tonality and saturation of colors as well as size which the printed photographs to be obtained from this negative must have.

The so realized printing and developing laboratories permit photographs with high quality and the required characteristics to be produced. However, the numbers of these photographs are the respectively selected ones and are obtained in the times required for carrying out fully the printing and developing cycles thereof, with consequent impossibility to increase such numbers and therefore to improve the productivity of the same laboratories, as would be desirable.

Besides, these laboratories involve the need to have appropriately skilled personnel at their disposal for each installed laboratory, requiring therefore high management burdens.

The object of the present invention is to eliminate the drawbacks and the limit use of the present photography printing and developing machines, by employing an operation control device for a plurality of machines of this kind, adapted to co-ordinate automatically the operation of the same machines so as to provide for the continuous printing and developing of large numbers of photographs, with the aid of a single person which provides on a single control center to set at work the machines respectively set for the printing and developing operations.

This control device is made with the constructive characteristics substantially described, with special reference to the enclosed claims.

Figure 2:
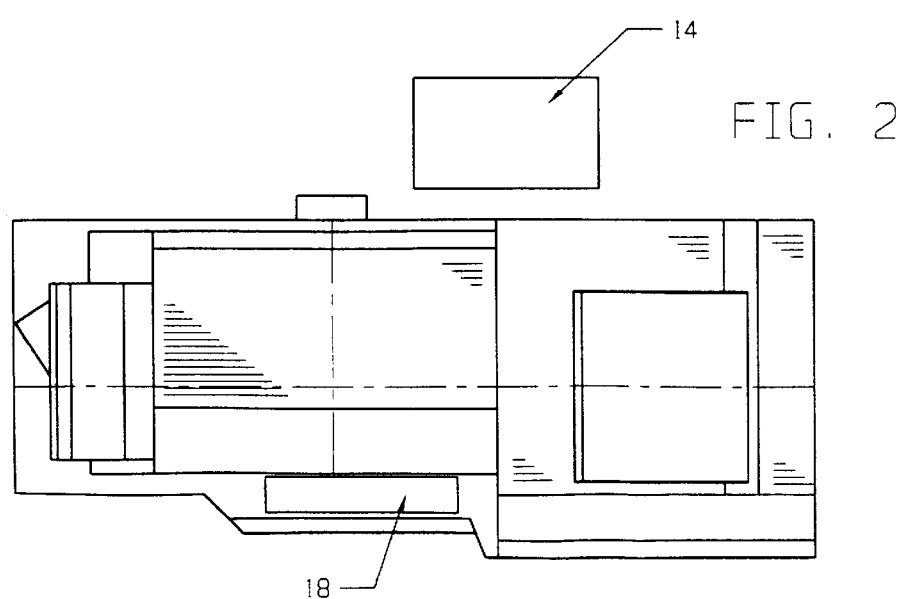

The invention will be better understood from the following description, given by way of a not-limiting example and with reference to the accompanying drawings, wherein:

FIGS. 1 and 2 schematically show a respective front and plan view of a conventional photography printing and developing machine;

FIG. 3 shows schematically a plan view of the control device according to the invention, associated with a plurality of printing and developing machines in accordance with FIGS. 1 and 2.

A conventional laboratory of professional type 5 for printing and developing a large number of color and black-and-white photographs, with different length and size is schematically represented in FIGS. 1 and 2, which laboratory can be made with electronic digital or analog technology, comprises substantially a printer marked with the reference numeral 6 and a developing machine 7 communicating laterally with such printer.

This printer 6 is composed of a metallic support structure 8 defining a horizontal support plane 9 for the photographic negatives to be printed and developed, on the upper part of which is housed the photographic paper 10 for preparing the printed photographs starting from the respective negatives, which paper is wound around a magazine 11 contained in a corresponding seat 12 of said support structure and associated to powered supply and cutting means of conventional type (not shown), which provide respectively for feeding them selectively in the single direction A and cutting them into parts of different length set in advance, depending on the number of photographs to be obtained. Moreover, the printer 6 is composed of a conventional optic assembly 13 with focal length adjustment in a vertical direction of conventional type, for focusing and changing the size of the images of the photographs to be obtained, as well as a lamp-housing 15 applied in the lower part of the support structure 8 and arranged below and aligned vertically with respect to the optic assembly 13, in which housing as usual set of lamps 16 of red, green and blue colors with manual and/or automatic lighting intensity adjustment are arranged, such lamps being adapted to generate a light beam with different and variable colors and intensities, which is directed upward and, by passing through each photographic negative laid onto the plane 9, projects the image thereof, adequately focused and enlarged by the optic assembly 13, on the photographic paper 10 which is disposed above it at a position coincident thereto, and is cut on parts of pre-established length, thereby providing for the exposure of the same paper at the needed extent for the subsequent automatic transport thereof by means of rolls (not shown) towards the developing machine 7, where this paper is developed in a conventional manner and within the developing times normally required (of some minutes), with consequent achievement of the printed positive photographs with the desired characteristics.

Finally, in order to permit the characteristics of each negative (sharpness, brightness, tonality and saturation of colors) to be adjusted at the desired values before starting each printing and developing cycle, the printer 6 is composed of at least a color monitor 17 connected to a color telecamera d4, which takes by means of a system of deviation mirrors (not visible) the negative image projected through the optic assembly 13, by permitting it to be displayed on the screen of monitor 17, and consequently such characteristics to be adjusted by acting on a keyboard 18 of an electronic control unit 19 connected operatively with both the printing and developing machines and adapted to control and manage each operating cycle which has been selected.

To this aim, the data relating to each type and size of photographic paper which has been used for permitting photographs with correspondent sizes to be printed are set, and the colors and the lighting intensity of the different lamps as well as the focal length and the size of the image to be printed on the photographic paper are also adjusted manually and/or automatically, and, when the adjustment has taken place, the relative set operating cycle is started and ended automatically when all the required photographs have been printed and developed.

Turning now to the FIG. 3, in which several laboratories of this kind are represented, in the present example three laboratories, it is noted that the control units 19 of each laboratory are connected operatively to a control device 20 according to the invention, adapted to control contemporaneously all the laboratories in order to provide for developing and printing continuously of photographs therein as it will be described later.

This control device includes substantially a control desk 21 in which at least an electronic processing unit 22 and a set of monitors 17 are contained, wherein the processing unit 22 is formed by data processing electronic circuits controlled by at least a central control unit 23 and connected operatively to the different control units 19 of the printing and developing machines as it will be described, and the set of monitors 17 are provided for displaying the adjustment conditions of the characteristics of the photographic negatives from which the correspondent printed photographs must be prepared, and for setting the data of these characteristics by means of at least a keyboard 24 connected to the central control unit 23 of the electronic processing unit 22.

Advantageously, these monitors are provided in a number equal to that of the printing and developing machines utilized, or it may be also provided a single monitor in which the images of all the negatives which are inspected in the same machines are displayed.

In turn, the electronic processing unit 22 of the control desk 21 is made advantageously as a conventional personal computer or similar device, in the central control unit 23 of which the data relating to the characteristics of sharpness, brightness, tonality and saturation of colors of each set of negatives to be developed belonging to a particular client, and the data of size of all the negatives inspected in each monitor are set by means of the keyboard 24, and in which such data are converted into coded informations which correspond to the qualitative characteristics of the photographs to be obtained and to the data identifying such photographs with the client's names belonging to them, which are printed with the relative prices on the rear side of the negatives and photographs, by means of the printer provided in each printer, in order to apply such identifying data later on the containers into which these printed photographs are arranged, and wherein the operative cycle set in this manner is managed for the entire duration thereof and moreover the correct operation of this cycle and the possible presence of operative faults thereof are checked.

In this way, owing to the connection of the central control unit 23 of the processing unit 22 with all the control units 19 of the different printing and developing machines foreseen, an exchange of coded informations of the data relating to the operative cycles is produced among all the units, wherein the central unit 23 is set in a manner to transmit to the different control units 19 the coded informations corresponding to the data of the operative cycles which have been set in the same central unit 23, and which must be carried out in the printing and developing machines, and to receive from such control units 19 the coded informations corresponding to the data of the operative cycles in the course of carrying out thereof, so as to manage the carrying out of these cycles and check the correct carrying out and any possible presence of operative faults thereof.

Likewise, the adjustment of the above characteristics may be effected also automatically, by storing to this aim in the central control unit 23 a set of programs with the pre-established characteristics which the photographs to be obtained from the different negatives must have, and some bar codes identifying the different stored programs and which are disposed on the correspondent negatives and photographs, and by setting in advance the printing and developing programs of the respective photographs to be obtained by means of the keyboard 24, so that during each operative cycle such programs are called back from time to time from the memory of the central control unit 23 and the coded informations corresponding thereto are transmitted to the central control units 19 of the different printing and developing machines, which therefore provide for performing the automatic adjustment at the desired values of the characteristics of the photographs to be printed.

Finally, it is necessary to refer to the fact that the present control device can also be arranged for displaying on the monitors 17 of self -adjusting, coloured standard images, with different and variable tonality and saturation of colours, by arranging for the sake specific push-buttons for selecting of these images on the keyboard 24 of the control desk 21, so as to permit the selection of these coloured standard images for the next printing of correspondent photographs, also from personnel which is not appropriately skilled to the colour adjustment and valuation.

The carrying out of the operating cycles of the different printing and developing machines occurs in a fully automatic way, by arranging in advance all the negatives to be printed and developed, with sizes compatible with the size of the photographic paper housed in each printer, in a correspondent magazine 25 which is applied on the support plane 9 of each printing and developing machines, at the level of the respective optic assembly 13 and set of lamps 16, magazine which is provided with conventional drive means in order to move selectively each negative towards the light beam produced by said lamps and passing through said optic assembly, so as to inspect it and regulate its characteristics at the desidered values, by acting on the keyboard 24 of the central control unit 23 with manual or automatic setting, as above described, and by displaying it on the correspondent monitors 17. When the adjustment has taken place, the push button of starting cycle (not shown) provided on the keyboard 24 and connected operatively to the central control unit 23, is pushed with consequent starting of such set cycle and carrying out of the same until all the required photographs have been printed.

The central control unit 23 of the present control device is set for controlling each printing and developing machine autonomously and independently from the other ones, with consequent carrying out of the operating cycle respectively set on such machine until the end thereof, and activating the first free available machine sensed at random by said control unit, thereby permitting the data of the characteristics of the photographs to be printed and the carrying out of this operating cycle to be set thereon.

In this manner, the control device according to the invention permits inspection of all the negatives from a single position and with a single operator, by controlling also the carrying out of the operating cycles of all the printing and developing machines, which are therefore performed automatically in each machine ready for the use, independently from the cycles set on the other machines and from their duration, which circumstance permits also, by utilizing the same machines, to increase considerably the numbers of the printed photographs with respect to those which would be obtained by using the same machines with autonomous and not co-ordinated to each other operation, and to obtain a high productive yield of the machines used, without necessity to have so many persons as the machines which are available, as it is still occuring, and therefore with a optimization of the costs for staff and machine management.

The present control device is set for the transcribtion of the images of the photographs to be printed also on supports of different kind, as for example on magnetic tapes, optical disks etc . . . , which are connected operatively to the central control unit 23, these images being obtained from the different monitors 17 and recorded in a conventional type on the supports respectively used.

The so equipped printing and developing machines can be used not only as professional machines but also as machines for amateurs, permitting in every case to obtain the same advantages cited above.

What is claimed is:

1. An operation control device for controlling a plurality of photographic printing and developing machines wherein each machine is adapted to print and develop a plurality of photographs with images from respective negatives and comprises a set of lamps adapted to generate light of variable intensity and color, optic means for focusing and changing the size of the images, means for monitoring said images, a magazine means for feeding photographic paper for printing and developing, a magazine means for selectively moving the negatives and an electronic control unit for controlling the characteristics of the photographs and the operative printing and developing cycles and for associating identifying indicia with the photographs, said operation control device comprising central control means operatively communicating with the electronic control unit of each of said plurality of photographic printing and developing machines and including a display means communicating with the monitoring means of each of said plurality of photographic printing and developing machines, whereby each of said plurality of photographic printing and developing machines are independently controlled by said central control means to set and monitor the characteristics of the photographs, the operative printing and developing cycles, the association of identifying indicia with the photographs, and activating the first free available machine sensed at random to perform a subsequent operative cycle.

2. The operation control device for controlling a plurality of photographic printing and developing machines as defined in claim 1, which further comprises an electronic processing unit communicating with said central control means and said display means.

3. The operation control device for controlling a plurality of photographic printing and developing machines as defined in claim 2, wherein said electronic processing unit is a personal computer.

4. The operation control device for controlling a plurality of photographic printing and developing machines as defined in claim 1, which further comprises a device operatively connected to said central control means for recording the images of said photographs.

* * * * *